(12) United States Patent
Wang

(10) Patent No.: US 11,875,653 B2
(45) Date of Patent: Jan. 16, 2024

(54) BINARY PERSONAL IDENTIFICATION NUMBER AUTHENTICATION FOR CONTACTLESS CARD

(71) Applicant: Xi Wang, Saint-Laurent (CA)

(72) Inventor: Xi Wang, Saint-Laurent (CA)

(*) Notice: Subject to any disclaimer, the term of this patent is extended or adjusted under 35 U.S.C. 154(b) by 37 days.

(21) Appl. No.: 17/164,813

(22) Filed: Feb. 1, 2021

(65) Prior Publication Data

US 2022/0245984 A1 Aug. 4, 2022

(51) Int. Cl.
| | | |
|---|---|---|
| *G06K 19/06* | (2006.01) | |
| *G07F 7/10* | (2006.01) | |
| *G06K 19/07* | (2006.01) | |
| *G06Q 20/40* | (2012.01) | |

(52) U.S. Cl.
CPC ....... *G07F 7/1058* (2013.01); *G06K 19/0718* (2013.01); *G06Q 20/4012* (2013.01); *G06Q 20/40145* (2013.01)

(58) Field of Classification Search
CPC .............. G07F 7/1058; G06K 19/0718; G06Q 20/4012

USPC .......................................................... 235/492
See application file for complete search history.

(56) References Cited

U.S. PATENT DOCUMENTS

| | | | | |
|---|---|---|---|---|
| 2008/0099556 A1* | 5/2008 | Park | ...................... | G07F 7/0806 235/492 |
| 2009/0159705 A1* | 6/2009 | Mullen | .................. | G06V 10/24 235/493 |
| 2018/0276672 A1* | 9/2018 | Breed | .................. | G06Q 20/321 |

\* cited by examiner

*Primary Examiner* — Jamara A Franklin

(57) ABSTRACT

A contactless card includes an arrangement of a plurality of tactile sensors along the edge, an arrangement of a plurality of tactile sensors on the surface or surfaces, an arrangement of a plurality tactile of sensors along the edge and on the surface or surfaces. The arrangement of a plurality of tactile sensors captures the interaction of the user's hand and the contactless card to generate a unique binary string. In addition to the validation of the identifying information embedded within the memory of any existing contactless credit card, debit cards, prepaid electronic cash card, loyalty card and access card, the user's identification is also validated through the binary string. An irreversible mathematical equation can be used to compute the identifying information and binary string to generate the validation Radio Frequency Identification signal.

8 Claims, 5 Drawing Sheets

BINARY PERSONAL IDENTIFICATION NUMBER AUTHENTICATION FOR CONTACTLESS CARD

BACKGROUND ON INVENTION

1. Field of the Invention

The present invention relates to the addition of a plurality of tactile sensors to an existing Radio Frequency Identification (RFID) contactless card. A plurality of tactile sensors generates a binary string as the personal identification number (PIN) with increased ease, speed and security. The contactless card has all the parts of the existing contactless credit card, debit cards, prepaid electronic cash card, loyalty card and access card.

2. Discussion of the State of the Art

The standardized International Standards Organization (ISO) contactless card with Radio Frequency Identification (RFI) technology is known as the digital key of the modern society. Radio Frequency Identification card contains identifying information stored in the memory through integrated circuit (IC), which is connected to an antenna. During the validation process, the integrated circuit responds back with a simple identifying information upon an interrogating radio frequency signal. Radio Frequency Identification technology allows the exchange of the identifying information without physical contact or line of sight. Radio Frequency Identification card is used in contactless electronic payment in numerous commercial applications. The examples of the most common commercial applications are credit card payment, bank card payment, prepaid electronic cash card payment and loyalty card payment. Radio Frequency Identification is also commonly used in industrial applications as identification access card to unlock door, to access to a computer security system, to access to computer control system and to provide user identification. The Radio Frequency Identification card provides the user a simple, fast and convenient ways to pay and to obtain access.

In all Radio Frequency Identification application, the identifying information stored in the card's memory is communicated to the validation terminal to obtain an authorization. The drawback of the Radio Frequency Identification system is that the validation process only validates the identifying information embedded within the card, and not the user's identity. Therefore, anyone in possession of the Radio Frequency Identification card can use it. As result, more advanced Radio Frequency Identification card is integrated with biometric sensor such as fingerprint scanner, which only requires the user to hold one finger against the fingerprint scanner during the validation. The fingerprint scan validates the user's identify, which offers an extra level of security to against fraud and unrightful usage. However, the fingerprint scanner generates an image information which takes longer time to process. Further drawback is that the fingerprint scanner and the fingertip must be free of water, moisture and foreign particle to obtain a successful scan. Another drawback is the significantly increases of cost and complexity of a Radio Frequency Identification card with fingerprint scanner.

Further innovation is made to improve the security of Radio Frequency Identification against fraud and unrightful usage, some cards are integrated with digital keyboard, an alphabetic keyboard and a touch keyboard to validate the user's identity. However, the need to type in a PIN on the keyboard, disrupts the seamless validation process. It is desirable to create a seamless validation solution with an extra level of security without higher cost and complexity.

This invention disclosure is a Radio Frequency Identification card with a plurality of tactile sensors, which generates a binary string according to the pattern how the hand is interacting with the tactile sensors on the card. In other words, the binary string is based on the way how the user's hand is holding the card during validation. A plurality of tactile sensors to generate the binary string is a low-cost solution, which offers an extra level of security against fraud and unrightful usage. Moreover, the generation of the binary string does not delay or disrupt the validation process.

BRIEF SUMMARY OF THE INVENTION

In one embodiment of the invention a contactless card is provided, comprising an orientation reference feature, a plurality of tactile sensors, a user's binary string generation and a Radio Frequency Identification signal output. Also, in one embodiment the contactless can be credit card, bank card, prepaid cash card, loyalty card, computer smart card, access card and identification card. Also in one embodiment the orientation reference feature can be any type of physical distinction on the card. Also in one embodiment of a plurality of sensors can be resistive touch sensors, capacitive touch sensors, photoresistive touch sensors and ultrasound touch sensors, or any other type of tactile sensors. Also in one embodiment of a plurality of sensors along the edge can be arranged in various pattern or array. Also in one embodiment of a plurality of sensors on the surface or surfaces can be arranged in various pattern or array. Also in one embodiment the mix of a plurality of sensors can be along the edge and the surface or surfaces of the card. Also in one embodiment the user's binary string generation is based on finger interaction with the contactless card during the validation process. Also in one embodiment the binary string is used to validate the user's identity. Also in one embodiment the Radio Frequency Identification signal output is computed through an irreversible mathematical equation with the value of the identifying information and binary string.

In another embodiment of the method to generate a binary string is provided, comprising of the interaction of the finger with sensors. Also in one embodiment of a method of interaction of finger with the tactile sensors on the edge. Also in one embodiment of a method of interaction of finger with the tactile sensors on the surface or surfaces. Also in one embodiment of a method of interaction of finger with the tactile sensors on the edge and surface or surfaces.

DETAILED DESCRIPTION OF THE EMBODIMENTS

Figure 1:
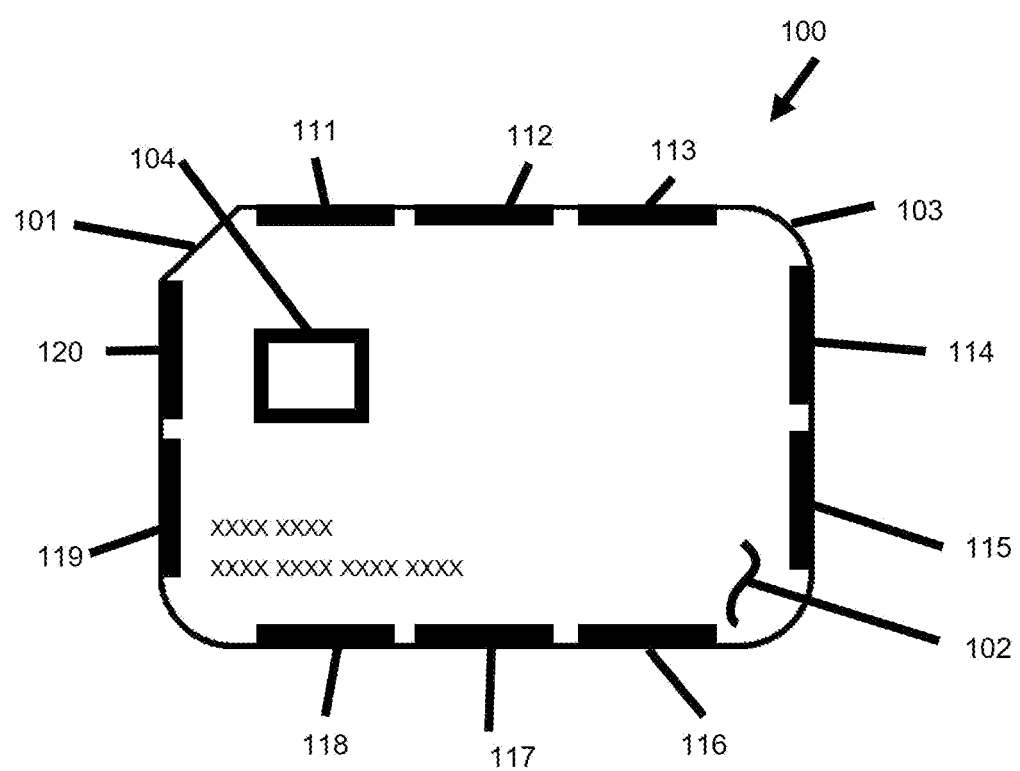
FIG. 1 is a top plan view of the schematic of one embodiment of the contactless card.

FIG. 1 is a top plan view of the schematic of the embodiment of a contactless card 100. Contactless card 100 comprising of an orientation reference feature 101, surface 102, edge 103 all around, memory 104, a plurality of tactile sensors, namely sensor 111, 112, 113, 114, 115, 116, 117, 118, 119 and 120. Contactless card 100 can be a credit card, banking card, prepaid cash card, loyalty card, computer smart card, access card and identification card. Reference feature 101 is a physical distinction to aid the user to locate the orientation of the contactless card. In detail, reference feature 101 is not limited to the fillet on any corner of contactless card 100, it can also be any type of physical distinction on contactless card 100. The user's identifying information is embedded within memory 104 of contactless card 100. Sensor 111, 112, 113, 114, 115, 116, 117, 118, 119 and 120 is not limited to resistive touch sensor, capacitive touch sensor, photoresistive touch sensor and ultrasound touch sensor. Sensor 111, 112, 113, 114, 115, 116, 117, 118, 119 and 120 are located along the edge 103, which is perpendicular to the surface 102. On surface 102, each sensor can be visually identified with a number, alphabetical letter, symbol or color code. Sensor 111, 112, 113, 114, 115, 116, 117, 118, 119 and 120 are electrical connected to memory 104. Sensor 111, 112, 113, 114, 115, 116, 117, 118, 119 and 120 can generate a ten bits binary string according the user's hand interaction with the sensors. The binary string is read by memory 104, but memory 104 does not store the binary string. During the momentarily interaction of the hand and the sensors, the value of the binary string is read by memory 104 and that value is available to be included in the return authentication radio frequency signal. The moment the contact is loss between the user's hand and the sensors, the binary string returns to all 0. It is also possible that the binary string is read by a secondary memory, which is linked to a secondary antenna, and generates a secondary output of radio frequency signal. During an authorization process, the user waves the contactless card 100 to the proximity of the validation terminal. The contactless card is powered by the terminal. Meanwhile the user's hand is interacting with the tactile sensors along the edge 103 of the contactless card 100, the specific engaged sensors generate the binary string. Radio Frequency Identification technology allows the exchange of the identifying information without physical contact or line of sight between the card and the terminal. Finally, the card's identifying information and the binary string is exchanged with the validation terminal through the radio frequency signal, if the card's identifying information and the binary string are correct, the authorization is granted.

Figure 2:
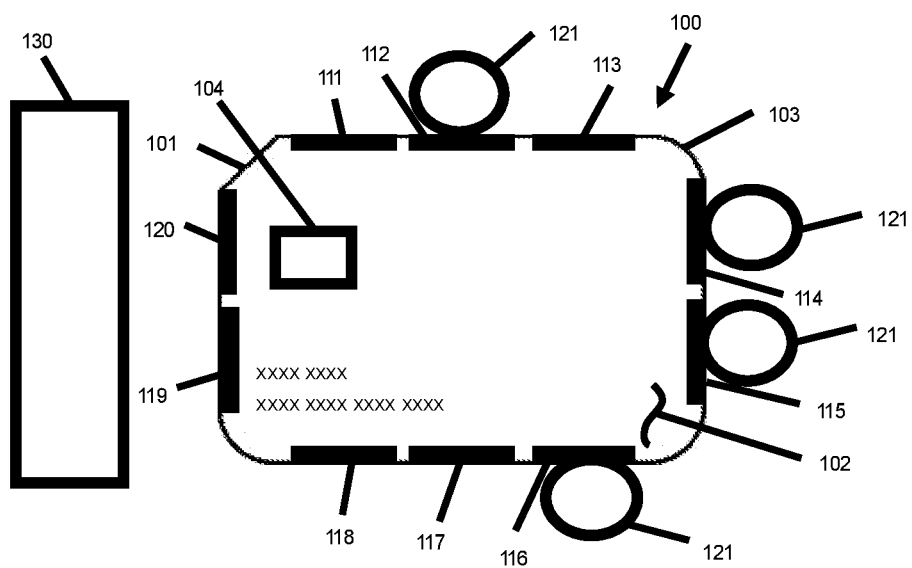
FIG. 2 is a top plan view of the schematic of the embodiment of one method of finger interacting with the sensors on the contactless card of FIG. 1.

FIG. 2 is a top plan view of the schematic of the embodiment of a method of binary string generation for contactless card 100. The string is generated based on the interaction of the user's finger with the sensors on the contactless card 100. The contactless card 100 with ten sensors, generates a ten bits binary number, which has 1023 possible combination. It is not limited to ten sensors. Sensor 111 is $10^{th}$ digit of the ten bits binary number, and the sensor 120 is the first digit of the ten bits binary number. Each sensor generates one binary value. The sensor with finger contact generates a binary output value of 1. Furthermore, the other sensor without finger contact generates a binary output value of 0. Or vice versa, the sensor in contact with the user's finger generates a binary output value of 0, and the sensor without finger contact generates a binary output value of 1. In our example, it is referred that a sensor in contact with finger is an engaged sensor, which generates a binary output value of 1. The user can choose the number of sensors they wish to engage. In a practical world, engaging 2 to 4 sensors is common, due to the ease of the finger interacting with the tactile sensors on the contactless card 100. The choice of 2 to 4 engaged sensors offers the possibility of nearly 400 combinations. In this example, 4 sensors are engaged. As the user waves the contactless card 100 in the proximity of the validation terminal 130. Meanwhile, the user's finger 121 maintains contact with sensor 112, 114, 115 and 116. As a result, the binary string generated is 0101110000. The validation terminal 130 interrogates the contactless card 100, and the return authentication radio frequency signal includes the identifying information embedded in the memory 104 and the user's binary string. In addition to the validation of the identifying information as in existing contactless credit card, debit cards, prepaid electronic cash card, loyalty card and access card, the user's binary string is also validated.

Figure 3:
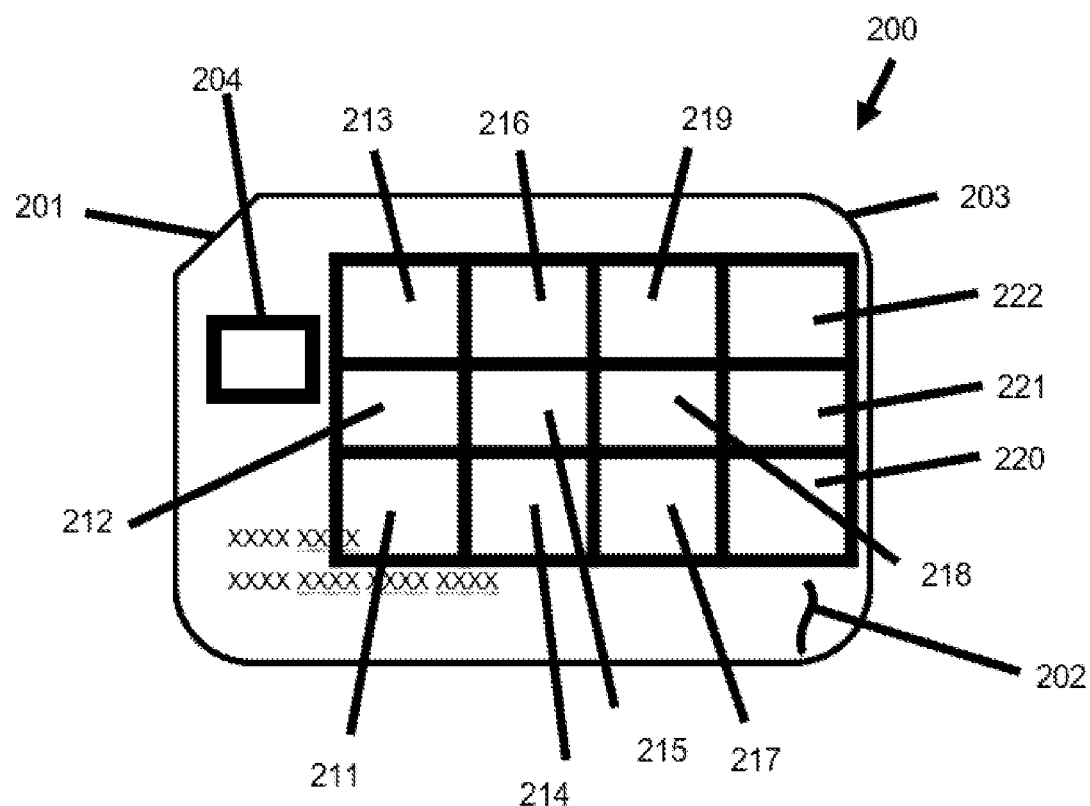
FIG. 3 is a top plan view of the schematic of another embodiment of the contactless card.

FIG. 3 is a top plan view of the schematic of the embodiment of the contactless card 200. Contactless card 200 comprising of an orientation reference feature 201, surface 202, edge all around 203, memory 204, a plurality of tactile sensors, namely sensor 211, 212, 213, 214, 215, 216, 217, 218, 219, 220, 221 and 222. Contactless card 200 performs and maintains all the described function of contactless card 100. The difference is that sensor 211, 212, 213, 214, 215, 216, 217, 218, 219, 220, 221 and 222 are located on surface 202. During an authorization process, the user waves the contactless card 200 to the proximity of the validation terminal. Meanwhile the user's finger is interacting with the tactile sensors on surface 202, the specific engaged sensors generate the binary string.

Figure 4:
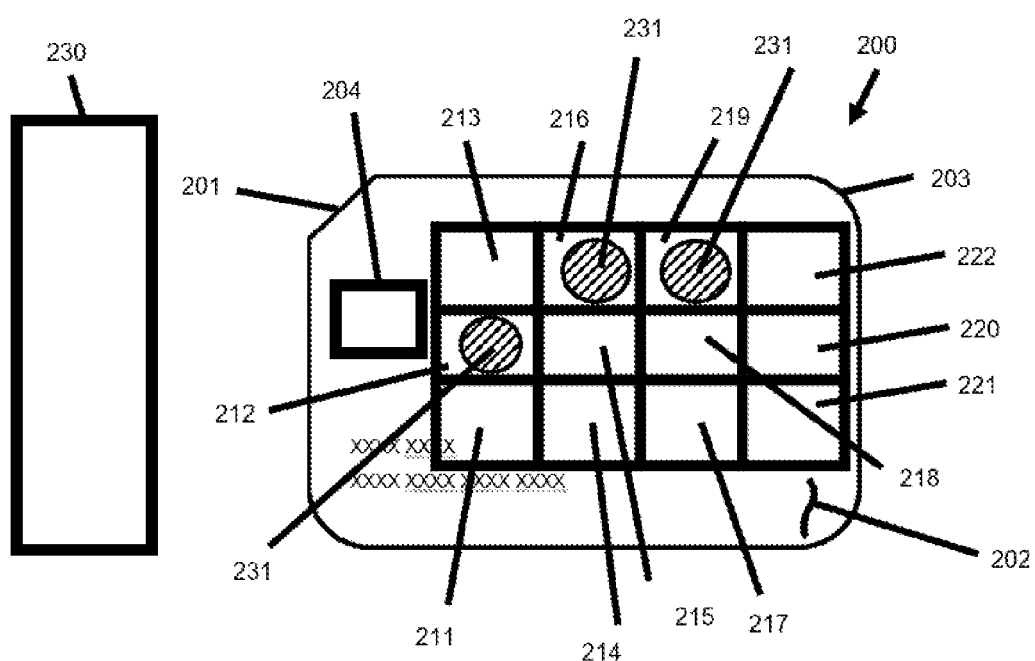
FIG. 4 is a top plan view of the schematic of the embodiment of the method of finger interacting with the sensors on the contactless card of FIG. 3.

FIG. 4 is a top plan view of the schematic of the embodiment of a method of binary string generation for contactless card 200. In this example, 3 sensors are engaged. As the user waves the contactless card 200 in the proximity of the validation terminal 230. Meanwhile, the user's finger 231 maintains contact with sensor 212, 216 and 219 of the contactless card 200, the engaged sensors are shown as the filled hatched circle for clarity. As a result, the binary string generated is 010001001000. The communicated Radio Frequency Identification signal composed of the identifying information from memory 204 and the binary string.

Figure 5:
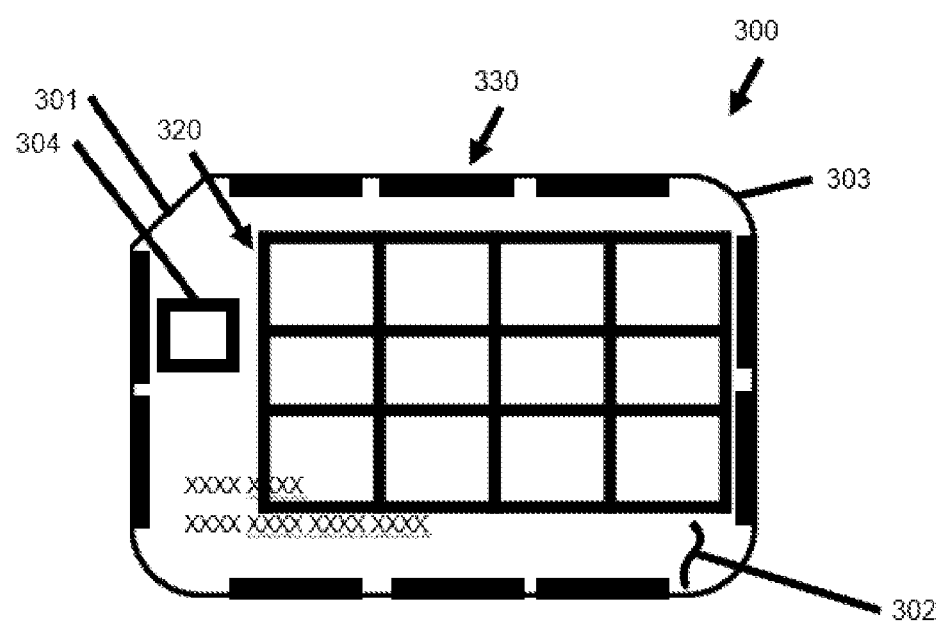
FIG. 5 is a top plan view of the schematic of another embodiment of the contactless card.

FIG. 5 is a top plan view of the schematic of the embodiment of the contactless card 300. Contactless card 300 comprising of the orientation reference feature 301, surface 302, edge all around 303, memory 304, a plurality of tactile sensors 320 on the surface 302, a plurality of tactile sensors 330 on the edge 303. Contactless card 300 performs and maintains all the described function of contactless card 100. The binary string of twenty-two bits binary number can generate over one million possible combinations.

As per mentioned, the validation Radio Frequency Identification signal includes the embedded identifying information and binary string. An irreversible mathematical equation can be used to compute the embedded identifying information and the binary string to generate the validation Radio Frequency Identification signal. In detail, the validation Radio Frequency Identification signal cannot be reversed to decode the embedded identifying information and the binary string.

The disclosure has been described with reference to particular embodiments and methods, it should be understood that the embodiments and methods are for illustrative and explanatory purpose. There are numerous variations, modifications and configurations which may be made without departing from the scope of this invention disclosure. For one instance, the sensor location and arrange can be made differently to the embodiment shown. The number of sensors can also be different to the embodiment shown. The sensors can be located on both surfaces of the contactless card. At least one of the advantages of the disclosed contactless card is to offer an extra level of security by validating the user's identity. Moreover, the validation process is compatible with existing validation hardware, software and protocol. Another advantage is that the binary string is not stored in the memory of the card, therefore the binary string is momentarily available for authentication during the contact of the hand and the sensors.

What is claimed is:

1. A method of authentication to validate the identity of the user for existing types of contactless credit card, bank card, prepaid cash card, loyalty card, computer smart card, access card and identification card comprising:
    (a) a user holding a contactless card to the proximity of a contactless validation terminal;
    (b) the user's hand interacting with a plurality of sensors on the surfaces and edges of the contactless card;
    (c) the plurality of sensors capturing the interaction of the user's hand to generate a binary code;
    (d) a validation process exchanging an identification number of the contactless card and the binary code generated by the engaged sensors; and
    (e) the validation terminal authenticating the user if the binary code is correct.

2. The method of claim 1 wherein, the user's hand interacting with the plurality of sensors is accomplished by the user's fingers, palm or a combination of both fingers and palm.

3. The method of claim 1 wherein, the binary code is generated according to the engaged sensors resulting from the user's hand interacting with the plurality of sensors.

4. The method of claim 1 wherein, the binary code is a dynamic value changing as the user's hand interacting differently with the plurality of sensors.

5. A method of authentication to validate the identity of the user for existing types of contactless credit card, bank card, prepaid cash card, loyalty card, computer smart card, access card and identification card comprising:
    (a) a user's hand interacting with a plurality of sensors on the surfaces and edges of a contactless card;
    (b) the user holding the contactless card to the proximity of a contactless validation terminal;
    (c) the plurality of sensors capturing the interaction of the user's hand to generate a binary code;
    (d) a validation process exchanging an identification number of the contactless card and the generated binary code by the engaged sensors; and
    (e) the validation terminal authenticating the user if the binary code is correct.

6. The method of claim 5 wherein, the user's hand interacting with the plurality of sensors is accomplished by the user's fingers, palm or a combination of both fingers and palm.

7. The method of claim 5 wherein, the binary code is generated according to the engaged sensors resulting from the user's hand interacting with the plurality of sensors.

8. The method of claim 5 wherein, the binary code is a dynamic value changing as the user's hand interacting differently with the plurality of sensors.

* * * * *